(12) United States Patent
Antal et al.

(10) Patent No.: US 9,984,146 B2
(45) Date of Patent: May 29, 2018

(54) METHOD AND SYSTEM FOR MAPPING NOTABLE ENTITIES TO THEIR SOCIAL PROFILES

(71) Applicant: Yahoo! Inc., Sunnyvale, CA (US)

(72) Inventors: Ekaterina Antal, Mountain View, CA (US); Akash Mehra, San Jose, CA (US); Mehmet Burak Akgun, Sunnyvale, CA (US); Nachiappan Nachiappan, Cupertino, CA (US)

(73) Assignee: OATH INC., New York, NY (US)

( * ) Notice: Subject to any disclaimer, the term of this patent is extended or adjusted under 35 U.S.C. 154(b) by 345 days.

(21) Appl. No.: 14/969,225

(22) Filed: Dec. 15, 2015

(65) Prior Publication Data

US 2017/0169095 A1 Jun. 15, 2017

(51) Int. Cl.
*G06F 17/30* (2006.01)
*H04L 29/08* (2006.01)

(52) U.S. Cl.
CPC .. *G06F 17/30598* (2013.01); *G06F 17/30525* (2013.01); *G06F 17/30528* (2013.01); *G06F 17/30867* (2013.01); *H04L 67/306* (2013.01)

(58) Field of Classification Search
CPC ......... G06F 17/30867; G06F 17/30528; G06F 17/30525; G06F 17/30598
USPC ....................................................... 707/738
See application file for complete search history.

(56) References Cited

U.S. PATENT DOCUMENTS

| | | | |
|---|---|---|---|
| 8,732,101 B1 | 5/2014 | Wilson et al. | |
| 8,762,472 B2 * | 6/2014 | Weinstein | G06Q 10/10 709/204 |
| 8,793,155 B2 | 7/2014 | Flake et al. | |
| 8,886,817 B2 * | 11/2014 | Ting | G06F 15/16 709/226 |
| 8,954,449 B2 | 2/2015 | Nelson et al. | |
| 9,033,783 B1 | 5/2015 | Ansari et al. | |
| 9,088,620 B2 | 7/2015 | Balakrishnan | |
| 9,111,211 B2 | 8/2015 | Mason et al. | |
| 9,135,211 B2 | 9/2015 | Stern et al. | |
| 9,135,657 B2 | 9/2015 | Flake et al. | |
| 9,460,215 B2 * | 10/2016 | Garg | G06F 17/3053 |
| 9,582,589 B2 * | 2/2017 | St. Clair | G06F 3/048 |
| 2009/0319288 A1 * | 12/2009 | Slaney | G06Q 10/10 705/1.1 |

(Continued)

OTHER PUBLICATIONS

Vu, Xuan Truong, et al., "A user-centered and group-based approach for social data filtering and sharing", Computers in Human Behavior, vol. 51, Part B, Oct. 2015, pp. 1012-1023.*

(Continued)

*Primary Examiner* — Robert Stevens
(74) *Attorney, Agent, or Firm* — Cooper Legal Group, LLC

(57) ABSTRACT

Methods, systems, and computer-readable media for mapping entities to social profile data. Social data regarding an entity (e.g., a notable entity, celebrity, movie, famous brand, etc.) is filtered from one or more open knowledge databases to produce filtered social data regarding the entity (or entities). The filtered social data is clustered and classified with respect to the entity according to a hash function to produce candidate results related to the entity. Ambiguous results are then filtered out from the candidate results, thereby automatically mapping facts contained in one or more of the open knowledge databases to a social profile associated with the entity.

20 Claims, 4 Drawing Sheets

(56) References Cited

U.S. PATENT DOCUMENTS

| | | | | |
|---|---|---|---|---|
| 2010/0027527 A1* | 2/2010 | Higgins | ................ | H04W 4/18 370/351 |
| 2010/0082627 A1* | 4/2010 | Lai | ................... | G06F 17/30867 707/738 |
| 2012/0324007 A1 | 12/2012 | Werz, III et al. | | |
| 2012/0324008 A1 | 12/2012 | Werz, III et al. | | |
| 2013/0124448 A1 | 5/2013 | Soulie-Fogelman | | |
| 2013/0124653 A1 | 5/2013 | Vick et al. | | |
| 2013/0268479 A1 | 10/2013 | Andler et al. | | |
| 2013/0311582 A1 | 11/2013 | Thai | | |
| 2016/0140167 A1* | 5/2016 | Perez | ................ | G06F 17/30424 707/769 |
| 2016/0191639 A1* | 6/2016 | Dai | ................... | G06Q 30/0255 709/204 |
| 2016/0267498 A1* | 9/2016 | Suman | ............... | G06Q 30/0201 |
| 2016/0364409 A1* | 12/2016 | Memon | ................ | H04W 4/021 |
| 2017/0006421 A1* | 1/2017 | Jerez | .................... | H04W 4/023 |
| 2017/0235792 A1* | 8/2017 | Mawji | ............... | G06F 17/30424 707/769 |

OTHER PUBLICATIONS

Ye, S. et al., "Measuring Message Propagation and Social Influence on Twitter.com," Social Informations (2010) Second International Conference, Laxenburg, Austria, Oct. 27-29, pp. 216-231.

Cha, M. et al., "Measuring User Influence in Twitter: Tee Million Follower Fallacy," Proceedings of the Fourth International AAAI Conference on Weblogs and Social Media (2010) pp. 10-17.

Brown, P. E. et al., "Measuring User Influence on Twitter Using Modified K-Shell Decomposition," The Social Mobile Web, Papers from the 2011 ICWSM Workshop (2011) Catalonia, Spain, Jul. 21, pp. 18-23.

Cha, M. et al., "Characterizing Social Cascades in Flickr," Proceedings of the First Workshop on Online Social Networks (2008) Seattle, Washington, Aug. 18, pp. 13-18.

* cited by examiner

METHOD AND SYSTEM FOR MAPPING NOTABLE ENTITIES TO THEIR SOCIAL PROFILES

BACKGROUND

The Internet provides access to a wide variety of resources. For example, text, video, and/or audio files, as well as web pages for particular subjects or news articles and other information, are accessible over the Internet. Access to these resources presents opportunities for specific content to be provided with the resources. Leveraging this content, however, requires the content to be searchable and organized.

An important goal in leveraging such content is to render rapid access to information based on search results. To achieve this goal, online electronic information cards are sometimes prepared for notable entities such as, for example, movies, brands, and famous people or celebrities, which are automatically displayed to the user in addition to search results. Linking such information cards to social profiles associated with such notable entities is a welcome feature that can enrich the information provided by such information cards, while saving a user time and aggravation during the search process. One of the primary problems with implementing such features efficiently to date has been the manual editorial work involved in preparing such online electronic information cards and linking web-based pages such as Wikipedia pages about the notable entity to the information card. Additionally, different data entities are typically loaded in the pipeline (without prior filtering), and then a classifier makes a final judgment call if this is the same entity or not. Such an approach is not easily scalable and leads to a high percentage of false negatives.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

In accordance with an example embodiment, a method for mapping entities to social profile data can include steps or operations such as filtering social data regarding an entity (e.g., a notable entity, celebrity, movie, famous brand, etc.) from one or more open knowledge databases to produce filtered social data regarding the entity (or entities), clustering and classifying the filtered social data with respect to the entity according to a hash function to produce candidate results related to the entity, and filtering out ambiguous results from the candidate results, thereby automatically mapping facts contained in one or more of the open knowledge databases to social profiles associated with the entity.

Various embodiments may be implemented via a device or system comprising a processor and a memory. The processor and memory are configured to perform one or more of the above described method operations. Other embodiments may be implemented via a computer readable storage medium having computer program instructions stored thereon that are arranged to perform one or more of the above described method operations.

These and other features and advantages of the disclosed embodiments will be presented in more detail in the following specification and the accompanying figures, which illustrate, by way of example, the principles of the disclosed embodiments.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms such as "and", "or", or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
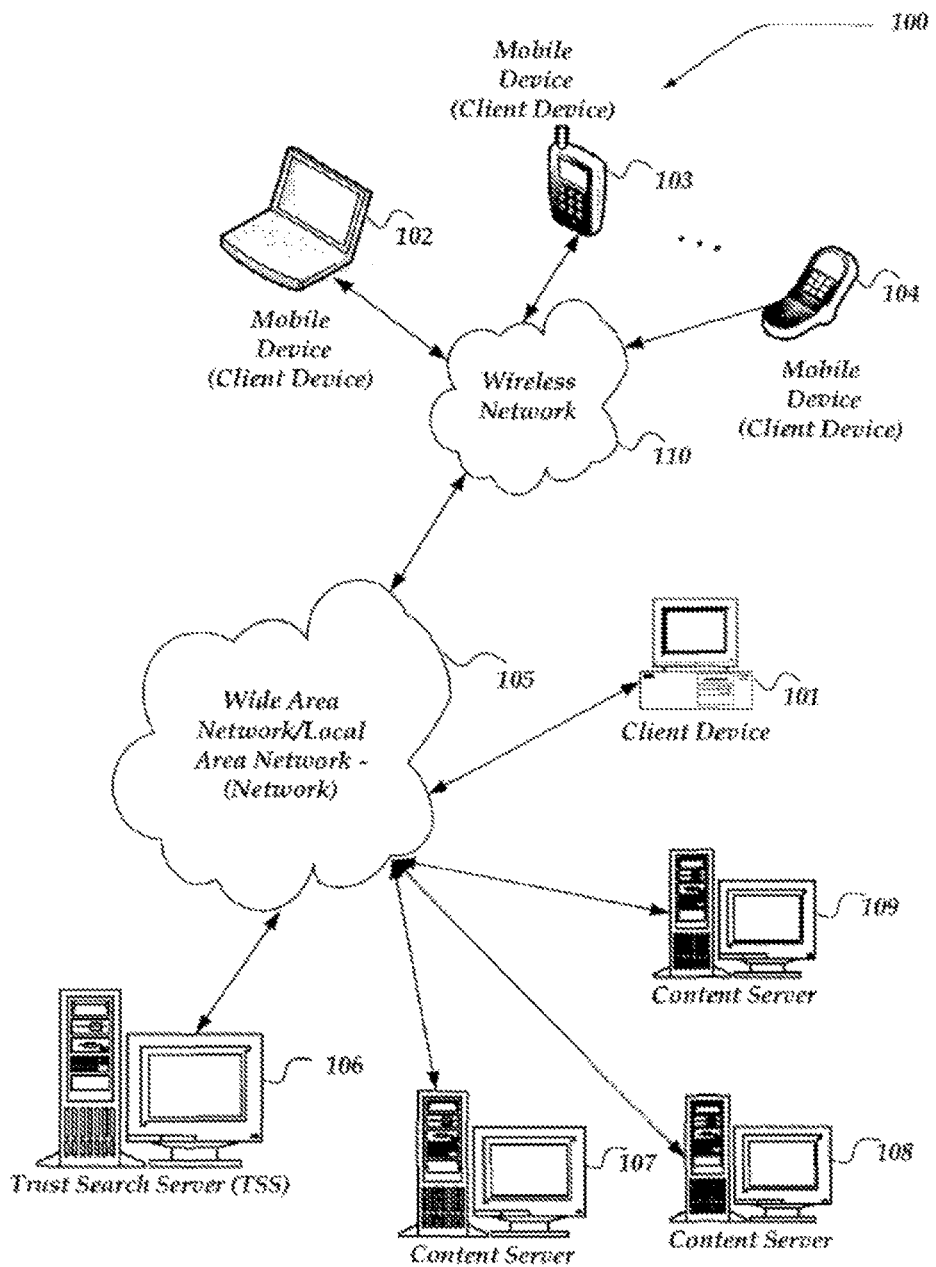
FIG. 1 illustrates a schematic diagram of an example embodiment of an environment in which a system for mapping notable entities to their social profiles may operate.

FIG. 1 illustrates a schematic diagram depicting an example embodiment of a system 100 composed of one or more networks. System 100 is an example of an environment in which a system for mapping notable entities to their social profiles, as described in greater detail herein, may operate. Other embodiments that may vary, for example, in terms of arrangement or in terms of type of components are also intended to be included within the claimed subject matter. The system 100 depicted in FIG. 1, for example, can include a variety of networks, such as a WAN (Wide Area Network)/LAN (Local Area Network) 105, a wireless network 110, a variety of devices, such as a client device 101 and mobile devices 102, 103, 104, and a variety of servers, such as content servers 107, 108, 109 and a trust search server (TSS) 106. In the example configuration depicted in FIG. 1, mobile devices 102, 103, and 104 are client devices that communicate wirelessly with system 100 through the wireless network 110. The WAN/LAN network 105 also communicates with the wireless network 110.

A content server such as content servers 107, 108, or 109 may include a device that includes a configuration to provide content via a network to another device. A content server may, for example, host a site, such as a social networking site, examples of which may include, without limitation, Flicker®, Twitter®, Facebook®, LinkedIn®, or a personal user site (e.g., such as a blog, vlog, online dating site, etc.). A content server may also host a variety of other sites including, but not limited to, business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor-type or programmable consumer electronics, etc.

A network such as network 105 and/or network 110 depicted in FIG. 1 can couple devices so that communications may be exchanged, such as between a server and a client device or other types of devices, including between wireless devices coupled via a wired or wireless network, for example. A network may also include mass storage, such as network-attached storage (NAS), a storage area network (SAN), or other forms of computer or machine-readable media, for example. A network may include the Internet, one or more Local Area Networks (LANs), one or more Wide Area Networks (WANs), wire-line type connections, wireless type connections, or any combination thereof. Likewise, sub-networks may employ differing architectures or may be compliant or compatible with differing protocols and may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network such as the wireless network 110 depicted in FIG. 1 may couple client devices with the network. That is, such a wireless network may employ stand-alone ad-hoc networks, mesh networks, wireless LAN (WLAN) networks, cellular networks, or the like. A wireless network such as wireless network 110 can further include a system of terminals, gateways, routers, or the like coupled by wireless radio links, or the like, which may move freely, randomly, or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks (e.g., networks 105, 110) may be compatible with or compliant with one or more protocols. The signaling formats or protocols employed may include, for example, TCP/IP, UDP, DECnet, NetBEUI, IPX, AppleTalk, or the like. Versions of the Internet Protocol (IP) may include IPv4 or IPv6.

The Internet refers to a decentralized global network of networks. The Internet includes Local Area Networks (LANs), Wide Area Networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc., that may route the signal packet in accordance with a target address and availability of a network path to the target address.

Figure 2:
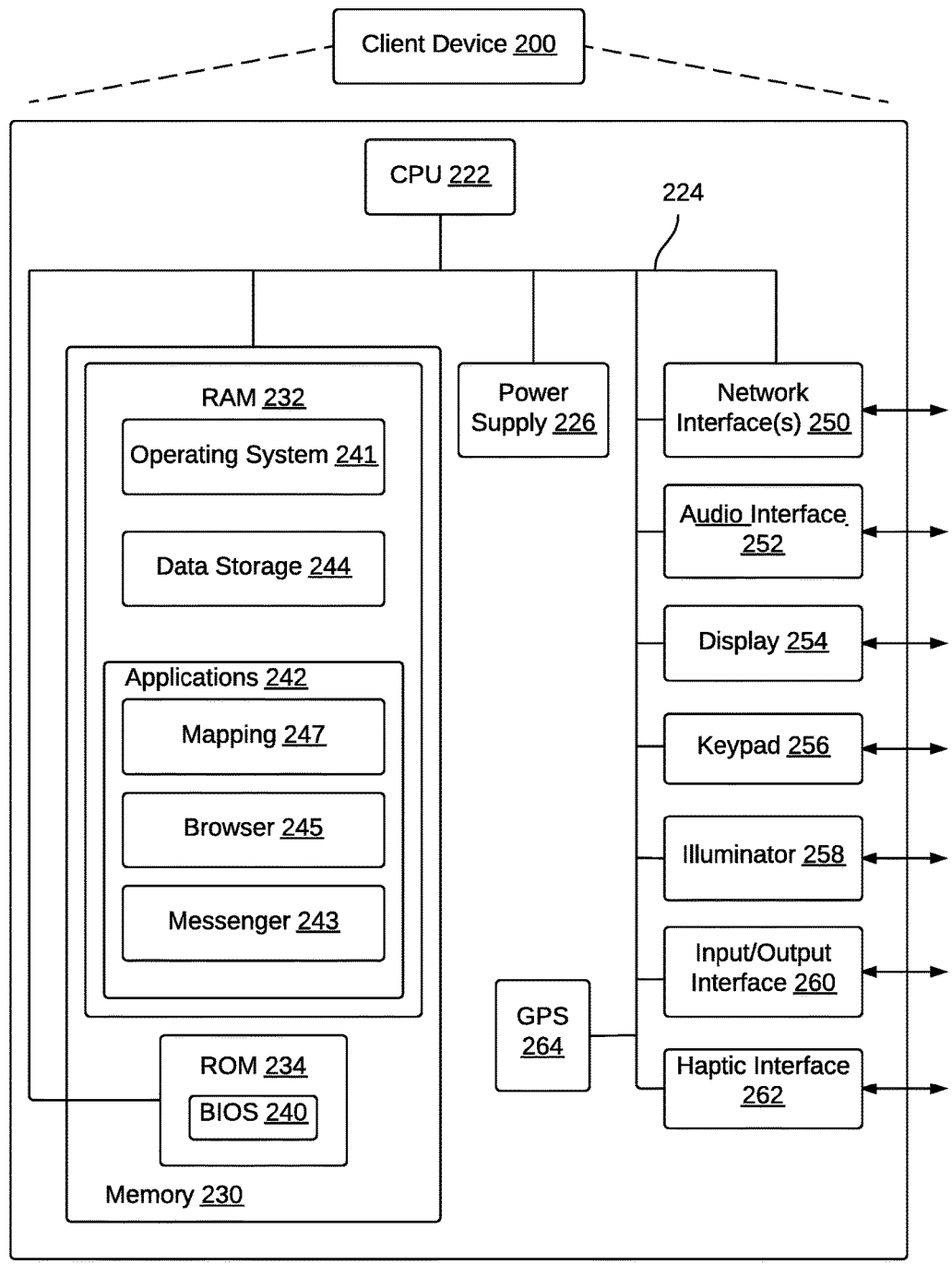
FIG. 2 illustrates a schematic diagram depicting an example embodiment of a client device that can be utilized for mapping notable entities to their social profiles.

FIG. 2 illustrates a schematic diagram depicting one example embodiment of a client device 200 that may be used as, for example, one or more of the client devices 101, 102, 103, and 104 depicted in FIG. 1. The client device 200 can function as a computing device capable of sending or receiving signals through a wired or a wireless network such as, for example networks 105, 110 depicted in FIG. 1.

The client device 200 may be implemented as, for example, a desktop computer or a portable device, such as a cellular telephone, a Smartphone, a display pager, a radio frequency (RF) device, an infrared (IR) device, a Personal Digital Assistant (PDA), a handheld computer, a tablet computer, a laptop computer, a desktop computer, a set top box, a wearable computer, or an integrated device combining various features, such as features of the foregoing devices, or the like.

A client device such as client device 200 may vary in terms of capabilities or features. The claimed subject matter is intended to cover a wide range of potential variations. For example, a cell phone may include a numeric keypad or a display of limited functionality, such as a monochrome liquid crystal display (LCD) for rendering text and other media. In contrast, however, as another example, a web-enabled client device may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display, for example.

A client device such as client device 200 may include or may execute a variety of operating systems, such as operating system 241, including in some example embodiments, a personal computer operating system, such as a Windows®, iOS® or Linux®, or a mobile operating system, such as iOS®, Android®, or Windows Mobile®, or the like. A client device such as client device 200 may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, Google+®, to provide only a few possible examples.

A client device, such as client device 200, may also include or execute an application to communicate content, such as, for example, textual content, multimedia content, or the like. A client device may also include or execute an application to perform a variety of possible tasks, such as browsing, searching, playing various forms of content, including locally stored or streamed video, or games (e.g., fantasy sports leagues, etc.). The foregoing is provided to illustrate that claimed subject matter is intended to include a wide range of possible features or capabilities. Examples of such applications (or modules) can include messenger 243, browser 245, and other client application(s) or module(s) such as a mapping module 247 that maps entities (e.g., notable entities) to their social profiles as discussed in greater detail herein with respect to, for example, the system 300 shown in FIG. 3 and the method 400 depicted in FIG. 4.

The example client device 200 shown in FIG. 2 generally includes a CPU (Central Processing Unit) 222 and/or other processors (not shown) coupled electronically via a system bus 224 to memory 230, power supply 226, and a network interface 250. The memory 230 can be composed of RAM (Random Access Memory) 232 and ROM (Read Only Memory) 234. Other example components that may be included with client device 200 can include, for example, an audio interface 252, a display 254, a keypad 256, an illuminator 258, and an input/output interface 260. In some example embodiments, a haptic interface 262 and a GPS (Global Positioning Satellite) unit 264 can also be electronically coupled via the system bus 224 to CPU 222, memory 230, power supply 226, and so on.

RAM 232 can store an operating system 241 and provide for data storage 244, and the storage of applications 242 such as, for example, browser 245 and messenger 243 applications. ROM 234 can include a BIOS (Basic Input/Output System) 240, which is a program that the CPU 222 utilizes to initiate the computing system associated with client device 200. BIOS 240 can also manage data flow between operating system 241 and components such as display 254, keypad 256, and so on.

Applications 242 can thus be stored in memory 230 and may be "loaded" (i.e., transferred from, for example, memory 230 or another memory location) for execution by the client device 200. Client device 200 can receive user commands and data through, for example, the input/output interface 260. The client device 200 in accordance with instructions from operating system 241 and/or application(s) 242 may then act upon such inputs. The interface 260, in some embodiments, can serve to display results, whereupon a user may supply additional inputs or terminate a session.

The software application(s) 242 can include one or more modules such as modules 243, 245, 247, and so on, which can, for example, implement instructions or operations such as those described herein. Examples of instructions that can be implemented by the mapping module 247, for example, include operations such as those shown and described herein with respect to, for example, FIGS. 3-4

The following discussion is intended to provide a brief, general description of suitable computing environments in which the disclosed methods and systems may be implemented. Although not required, the disclosed embodiments will be described in the general context of computer-executable instructions, such as program modules, being executed by a single computer. In most instances, a "module" constitutes a software application. However, a module may also comprise, for example, electronic and/or computer hardware or such hardware in combination with software. In some cases, a "module" can also constitute a database and/or electronic hardware and software that interact with the database.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term "module," as utilized herein, may refer to a collection of routines and data structures that perform a particular task or implement a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term "module" may also simply refer to an application, such as a computer program designed to assist in the performance of a specific task, such as word processing, accounting, inventory management, etc. Thus, the instructions or steps such as those shown in FIGS. 3-4 and discussed elsewhere herein can be implemented in some example embodiments in the context of such a module or a group of modules, sub-modules, and so on. For example, in some embodiments, the applications 242 illustrated in FIG. 2 in the context of client device 200 can function as a module composed of a group of sub-modules such as, for example, the mapping module 247, the browser 245, the messenger 243, and so on.

Figure 3:
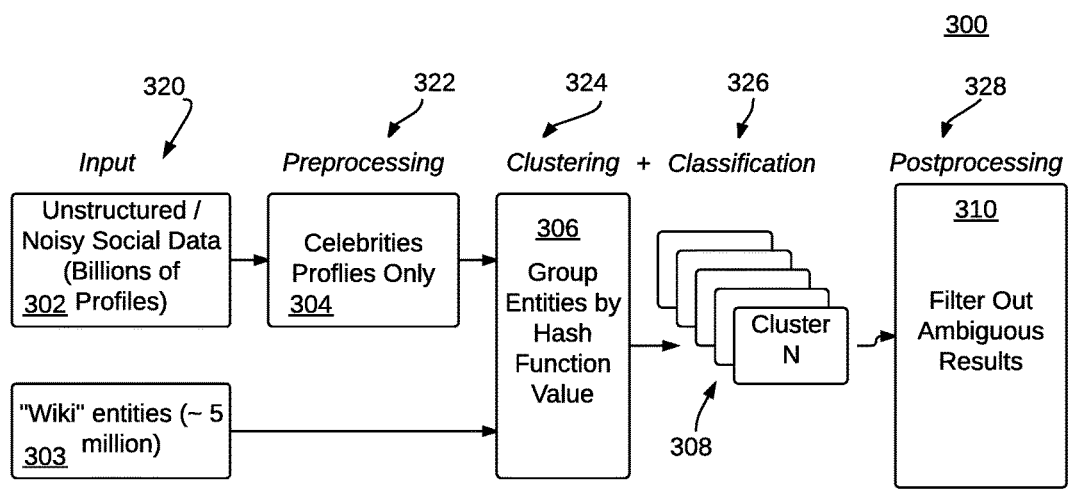
FIG. 3 illustrates a block diagram of a system for mapping entities to their social profiles, in accordance with an example embodiment.

FIG. 3 illustrates a block diagram of a system 300 for mapping notable entities to their social profiles, in accordance with an example embodiment. Note that, as utilized herein, the term "notable entity" or "notable entities" can refer to a famous person, celebrity, movie, famous brand, business, organization, etc. The system 300 shown in FIG. 3 can be composed of an input portion 320, a preprocessing module 322, a clustering module 324, a classification module 326, and a postprocessing module 328. In the example embodiment depicted in FIG. 3, the input portion 320 includes two types of input data. As shown at block 302, for example, such input data can include unstructured/noisy social data (e.g., billions of social profiles). As depicted at block 303, such input data may include "Wiki" (or "wiki") entities (e.g., entries from Wikipedia) and may include millions of such entities.

The "social data" depicted in block 302 is typically embodied as social profiles and related information and other "social" data contained in a social network. The term "social network" refers generally to a network of individuals, such as acquaintances, friends, family, colleagues, or co-workers, coupled via a communications network or a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like.

A social network may include individuals with similar experiences, opinions, education levels, or backgrounds. Subgroups may exist, or be created, according to user profiles of individuals. For example, a subgroup member may belong to multiple other or related subgroups. An individual may also have multiple "1:few" associations within a social network, such as for family, college classmates, or co-workers.

An entity's social network may refer to a set of direct personal relationships or a set of indirect personal or other relationships. A direct personal relationship, for example, refers to a relationship in which communications may be individual to individual, such as with family members, friends, colleagues, co-workers, or the like. An indirect personal relationship refers to a relationship that may be available to one individual with another individual although no form of direct individual-to-individual communication may have taken place. This might be, for example, a relationship characterized as a friend of a friend, or the like.

Different privileges or permissions may be associated with relationships in a social network. A social network also may generate relationships or connections with entities other than a person, such as companies, brands, or so-called 'virtual persons'. An individual's social network may be represented in a variety of forms, such as visually, electronically, via audio content, or functionally. For example, a "social graph" or "socio-gram" may represent an entity in a social network as a node and a relationship as an edge or a link.

Note that as utilized herein, the term "wiki" refers to a type of website or web portal that allows for collaborative modification of its content and structure directly from a web browser. In a typical wiki, text can be written using a markup language (e.g., a "wiki markup") and edited with the assistance of a rich-text editor or other editing software. A wiki can be run utilizing wiki software, also known as a wiki engine. One well-known example of a "wiki" is Wikipedia.

The preprocessing module 332 depicted in FIG. 3 is configured to filter out those social entities that have no chance to be present in the "wiki" dump as shown at block 322. A goal of the preprocessing module 332, as indicated by the filtering operation depicted at block 304, is to reduce the number of social profiles under consideration from billions (e.g., such as the billions of profiles indicated at block 302) to a few million profiles of well recognized people who have a chance to be mentioned in open knowledge databases like Wikipedia. A user influential score in a social network is one type of filtering criteria that can be utilized in this context.

It should be appreciated, however, that there are many social media accounts that parody, or otherwise counterfeit influential accounts. Such parody accounts are often "followed" by hundreds of thousands of people. The aforementioned metrics fail to distinguish real celebrity accounts, for example, from their popular fake counterparts.

Certain metrics can be utilized, however, to address this problem. Social network providers usually authenticate a small subset of verified accounts from the vast number of total accounts. A verified flag can be associated with an account. The verified flag may, for example, mean that the account was manually checked and is guaranteed to be associated with the entity identified by the account; most often a real notable entity profile. Additionally, accounts that are followed by these verified accounts can also be included according to the assumption that, in general, real highly visible and influential accounts also follow trustworthy accounts. A verified ego network is the most reliable source of real and influential accounts in the context of social networks.

Following preprocessing, instructions associated with the clustering module 324 can be implemented followed by classification operations via the classification module 326. A goal of the clustering and classification operations is identify social and wiki (e.g., Wikipedia) profiles that belong to the same person and to merge them. A complexity for such a comparison would be, for example, $O(n^2)$ and can be optimized by grouping entities based on their hash values, as indicated at block 306.

In order to calculate the hash, a common attribute (such as a person's name) can be determined, which is present in all entity types coming from social and Wikipedia networks. The hash function is calculated based on this common attribute. Entities are clustered based on their hash values. Within each cluster, a classification algorithm 308 can be run. Such a classification technique can be utilized to extract all possible attributes based on the entity source. Then, the algorithm normalizes the text tokens and compares such tokens with each other. If a final similarity score is higher than a certain configurable threshold, the entities are considered to be equal.

Finally, instructions associated with the postprocessing module 328 can be implemented. That is, ambiguous results are filtered out, as shown at block 310. A goal of the postprocessing module is to resolve mapping ambiguities when more than one of the entities coming from the same source is merged. In this case, the filtering algorithm or operations shown at block 310 can be configured to define which entity is more likely to be real. If there is a single verified entity among ambiguous results, this entity will be chosen. Otherwise, a classifier is introduced that is trained on real and fake social network handles. The classifier can distinguish handles by, for example, their format, characters used, and similarity to people names. If these two heuristics are not met, the ambiguous result is ignored.

Figure 4:
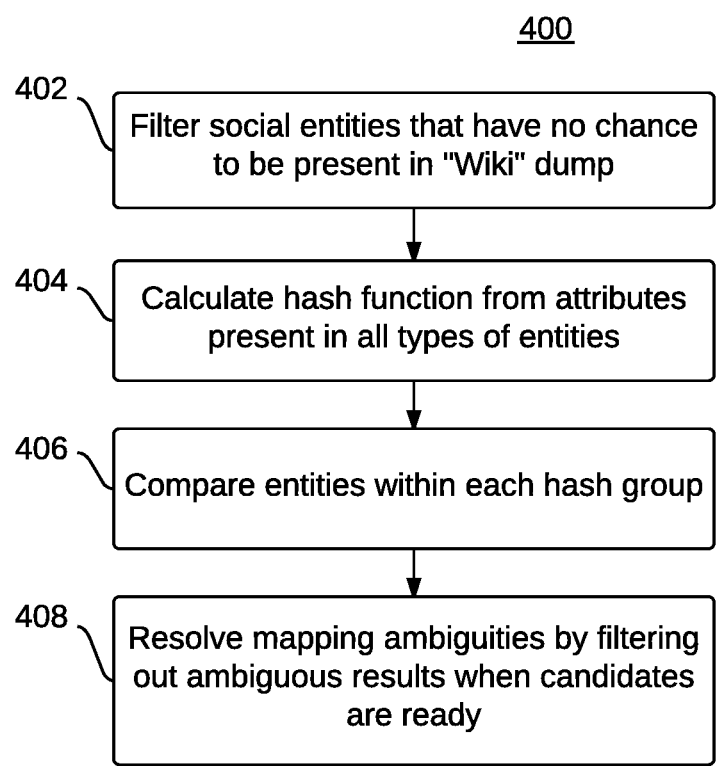
FIG. 4 illustrates a high-level flow chart of operations depicting logical operational steps of a method for mapping notable entities to their social profiles, in accordance with an example embodiment.

FIG. 4 illustrates a high-level flow chart of operations depicting logical operational steps of a method 400 for mapping notable entities to their social profiles, in accordance with an example embodiment. The method 400 shown in FIG. 4 can be broken down into three phases. The first phase, as shown at block 402, involves filtering out social entities that do not have a chance of being present in the "wiki" dump as discussed above. The second phase, as illustrated respectively at blocks 404 and 406 involves calculating a hash function from attributes that are present in all types of entities, and comparing entities within each hash group. This second phase includes operations associated with, for example, the respective clustering and classification modules 324 and 326 shown in FIG. 4. The third phase, as depicted at block 408, involves filtering out ambiguous results when candidates are ready. That is, as discussed above, mapping ambiguities are resolved when more than one entity derived from the same source is merged.

The method 400 shown in FIG. 4 and the system 300 depicted in FIG. 3 are highly efficient and accurate. Such an approach filters out social profiles that cannot have a presence in open knowledge databases (e.g., Wikipedia) and introduces a classification technique that allows for the setting of weak classification criteria, and then post-processing possible candidates within the group.

Example embodiments illustrated in FIGS. 1-4 serve only as examples to illustrate several ways of implementing the present disclosure. They should not be construed as to limit the spirit and scope of the example embodiments of the present disclosure. It should be noted that those skilled in the art may still make various modifications or variations without departing from the spirit and scope of the example embodiments. Such modifications and variations shall fall within the protection scope of the example embodiments, as defined in the attached claims.

The invention claimed is:

1. A method for mapping entities to social profile data, comprising:
    filtering social data regarding at least one entity from at least one open knowledge database to produce filtered social data regarding said at least one entity;
    clustering and classifying said filtered social data with respect to said at least one entity according to a hash function to produce candidate results related to said at least one entity; and
    filtering out ambiguous results from said candidate results, thereby automatically mapping facts contained in said at least one open knowledge database to social profiles associated with said at least one entity.

2. The method of claim 1 wherein filtering social data regarding at least one entity from at least one open knowledge database to produce filtered social data, further comprises:
    filtering said social data regarding said at least one entity based on data associated with a subset of verified social network accounts originating from a social network provider.

3. The method of claim 1 wherein clustering and classifying said filtered social data with respect to said at least one entity according to a hash function to produce candidate results related to said at least one entity, further comprises:
    calculating said at least one hash function based on a common attribute.

4. The method of claim 1 wherein clustering and classifying said filtered social data with respect to said at least one entity according to a hash function to produce candidate results related to said at least one entity, further comprises:
    clustering said at least one entity based on said hash function.

5. The method of claim 1 wherein clustering and classifying said filtered social data with respect to said at least one entity according to a hash function to produce candidate results related to said at least one entity, further comprises:
    calculating said at least one hash function based on a common attribute; and
    clustering said at least one entity based on said hash function.

6. The method of claim 1 wherein filtering out ambiguous results further comprises:
    determining if a single verified entity is contained among said ambiguous results; and
    selecting said single verified entity in response to determining that said single verified entity is contained among said ambiguous results.

7. The method of claim 1 wherein classifying said filtered social data further comprises:
    classifying said filtered social data utilizing a classifier that is trained to determine a difference between real social network data and fake social network data.

8. A system for mapping entities to social profile data, said system comprising:
    at least one processor; and
    a memory, wherein said at least one processor or said memory is configured for:
        filtering social data regarding at least one entity from at least one open knowledge database to produce filtered social data regarding said at least one entity;
        clustering and classifying said filtered social data with respect to said at least one entity according to a hash function to produce candidate results related to said at least one entity; and
        filtering out ambiguous results from said candidate results, thereby automatically mapping facts contained in said at least one open knowledge database to social profiles associated with said at least one entity.

9. The system of claim 8 wherein filtering social data regarding at least one entity from at least one open knowledge database to produce filtered social data, further comprises:
    filtering said social data regarding said at least one entity based on data associated with a subset of verified social network accounts originating from a social network provider.

10. The system of claim 8 wherein clustering and classifying said filtered social data with respect to said at least one entity according to a hash function to produce candidate results related to said at least one entity, further comprises:
    calculating said at least one hash function based on a common attribute.

11. The system of claim 8 wherein clustering and classifying said filtered social data with respect to said at least one entity according to a hash function to produce candidate results related to said at least one entity, further comprises:
   clustering said at least one entity based on said hash function.

12. The system of claim 8 wherein clustering and classifying said filtered social data with respect to said at least one entity according to a hash function to produce candidate results related to said at least one entity, further comprises:
   calculating said at least one hash function based on a common attribute; and
   clustering said at least one entity based on said hash function.

13. The system of claim 8 wherein filtering out ambiguous results further comprises:
   determining if a single verified entity is contained among said ambiguous results; and
   selecting said single verified entity in response to determining that said single verified entity is contained among said ambiguous results.

14. The system of claim 8 wherein classifying said filtered social data further comprises:
   classifying said filtered social data utilizing a classifier that is trained to determine a difference between real social network data and fake social network data.

15. A non-transitory computer-readable storage medium for mapping entities to social profile data, comprising:
   instructions for filtering social data regarding at least one entity from at least one open knowledge database to produce filtered social data regarding said at least one entity;
   instructions for clustering and classifying said filtered social data with respect to said at least one entity according to a hash function to produce candidate results related to said at least one entity; and
   instructions for filtering out ambiguous results from said candidate results, thereby automatically mapping facts contained in said at least one open knowledge database to social profiles associated with said at least one entity.

16. The non-transitory computer-readable storage medium of claim 15 wherein said instructions for filtering social data regarding at least one entity from at least one open knowledge database to produce filtered social data, further comprises:
   instructions for filtering said social data regarding said at least one entity based on data associated with a subset of verified social network accounts originating from a social network provider.

17. The non-transitory computer-readable storage medium of claim 15 wherein said instructions for clustering and classifying said filtered social data with respect to said at least one entity according to a hash function to produce candidate results related to said at least one entity, further comprises:
   instructions for calculating said at least one hash function based on a common attribute; and
   instructions for clustering said at least one entity based on said hash function.

18. The non-transitory computer-readable storage medium of claim 15 wherein said instructions for filtering out ambiguous results further comprises:
   instructions for determining if a single verified entity is contained among said ambiguous results.

19. The non-transitory computer-readable storage medium of claim 18 wherein said instructions for filtering out ambiguous results further comprises:
   instructions for selecting said single verified entity in response to determining that said single verified entity is contained among said ambiguous results.

20. The non-transitory computer-readable storage medium of claim 15 wherein said instructions for classifying said filtered social data further comprises:
   instructions for classifying said filtered social data utilizing a classifier that is trained to determine a difference between real social network data and fake social network data.

* * * * *